Dec. 18, 1923.  
J. L. WHEELER  
1,478,155  
FABRIC MEASURING AND COST COMPUTING MACHINE  
Filed Aug. 31, 1922   3 Sheets-Sheet 1

Inventor:  
John L. Wheeler.  
By Elliott & Newnen  
Attorneys.

Patented Dec. 18, 1923.

1,478,155

UNITED STATES PATENT OFFICE.

JOHN L. WHEELER, OF ST. LOUIS, MISSOURI, ASSIGNOR TO THE MEASUREGRAPH COMPANY, OF ST. LOUIS, MISSOURI, A CORPORATION OF DELAWARE.

FABRIC MEASURING AND COST COMPUTING MACHINE.

Application filed August 31, 1922. Serial No. 585,367.

*To all whom it may concern:*

Be it known that I, JOHN L. WHEELER, a citizen of the United States, residing in the city of St. Louis and State of Missouri, have invented new and useful Improvements in Fabric Measuring and Cost Computing Machines, of which the following is a specification.

This invention relates to measuring machines. Such machines usually embody in their construction, a driving member which is actuated during the measuring movement and which actuates the indicating mechanism through a driving gear train, usually including reduction gearing. The use of such a gear train of course, involves a certain amount of lost motion or "backlash" in the gearing, and the presence of this backlash entails an inaccuracy in the indicated measurement as shown by the indicating pointer or chart of the indicating mechanism. The general object of this invention is to produce a measuring machine which will operate automatically to eliminate this error from the reading of the indicating mechanism. Such measuring machines also usually include resetting means for returning the indicating mechanism to zero after a measuring movement, and one of the objects of the present invention is to construct the embodiment of my improvement in such a way as not to interfere with the performance of this function in the machine; also to provide mechanism to co-operate with the resetting mechanism in such a way that after the measuring movement, the mechanism will be set in a relation which will operate to eliminate the backlash in the first part of the measuring movement, and after the backlash has been taken up or absorbed, the machine will automatically inhibit the operation of the backlash eliminating mechanism. A further object of the invention is to provide means for adjusting a measuring machine to eliminate the backlash corresponding to the particular driving train of that machine, and where the machine has special uses, to provide for altering the reading of the indicating mechanism to correct the same, for example, in adapting a fabric measuring machine for measuring remnants as well as piece goods drawn from a roll. The invention is particularly applicable to the type of measuring machine for measuring fabric which involves the use of a measuring roller and a presser roller which is movable toward or from the measuring roller; in such a machine, while the presser roller is raised, the indicating mechanism should be returned to zero, but through carelessness of the operator, sometimes the presser roller will be let down upon the measuring roller before the indicating mechanism has completed its return movement to zero; if this happens, the indicating mechanism will be stopped before it arrives at zero and this might result in producing a false reading or indication in the indicating mechanism of the machine. One of the objects of the invention is to adapt the improvement to a machine of this type and to provide a construction which will prevent movement of the presser roller against the measuring roller until the resetting to zero has been completed.

Further objects of the invention will appear hereinafter.

The invention consists in the novel features, and in the general combination of parts to be particularly described hereinafter, all of which contribute to produce a simple and efficient fabric measuring and cost computing machine. A preferred embodiment of my invention will be particularly described in the following specification, while the broad scope of my invention will be pointed out in the appended claims.

The machine illustrated has a casing or case 1, the upper face of which is provided with indicating mechanism including a dial 2 having a scale for indicating the unit of measure, for example, yards, inches and yard fractions. On this dial, revolves a fast-moving pointer 3 and a slow-moving pointer 4, the latter of which indicates yards and the former, yard fractions and inches. The upper side of the casing is also provided with two windows 5 and 6 through which two charts 7 and 8 are visible, said charts bearing numbers which come into alignment with price rates on two scales 9.

Figures 1, 2, 11:
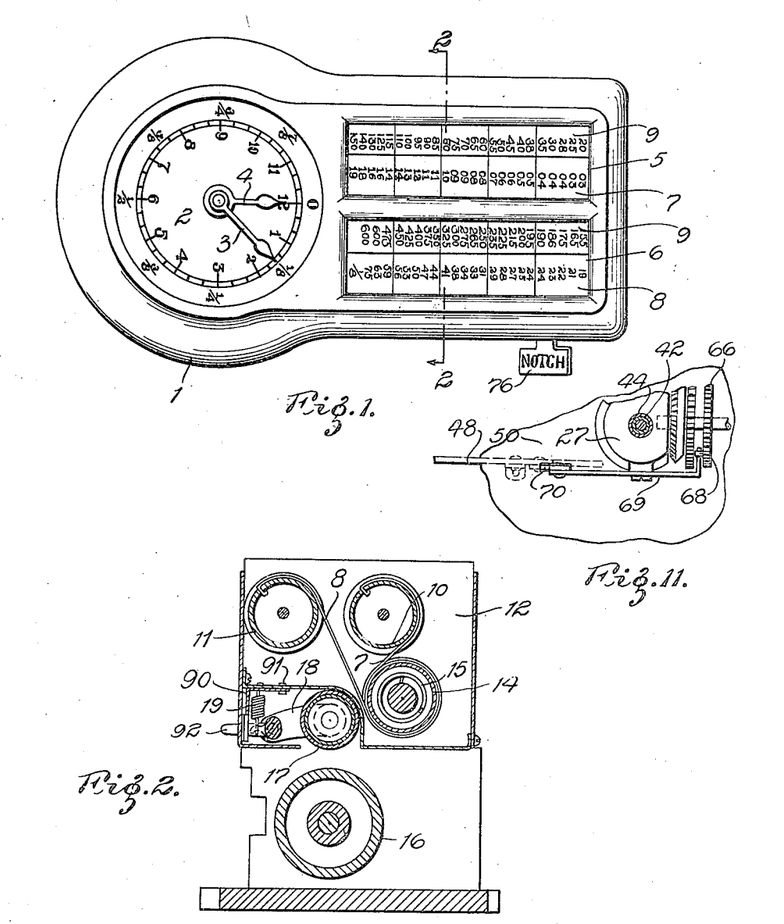
Figure 1 is a plan of a fabric measuring and cost computing machine embodying my invention.
Figure 2 is a vertical section taken about on the line 2—2 of Figure 1, but with many parts omitted; this view illustrates the relation of the presser roller to the measuring roller, and also illustrates the mounting for the charts, and the spring which effects the resetting of the indicating mechanism to zero.
Figure 11 is a horizontal section taken about on the level of the line 11—11 of Figure 7, certain parts being broken away; this view particularly illustrates details of the tripping mechanism.
Figure 3:
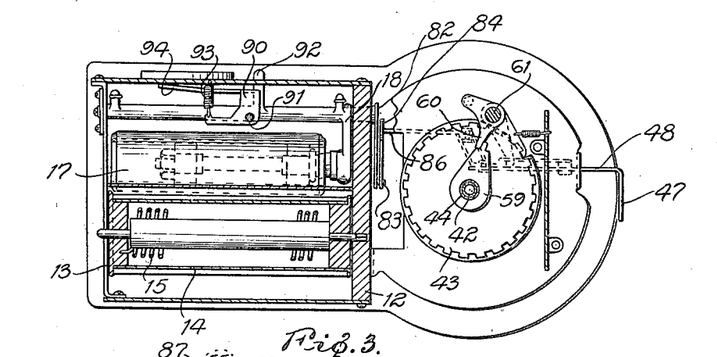
Figure 3 is a horizontal section through the machine taken about on the line 3—3 of Figure 6, certain parts being broken away and omitted.

These charts 7 and 8 are wrapped at one end upon two take-up rollers 10 and 11 which are rotatably mounted between a main frame plate 12 and an outer frame plate 13 (see Figures 2 and 3). The lower ends of these charts are wrapped upon a drum 14, and means is provided for resetting the charts to their zero position. This means may consist of a spring 15 disposed within the drum 14 and tending to rotate the drum in a direction to rewind the charts upon the drum after the take-up rollers have been actuated in a measuring movement.

I shall now describe the means for driving the pointers 3 and 4 and the take-up rollers 10 and 11.

The machine illustrated comprises a measuring roller 16 (see Figures 2 and 7) with which co-operates a presser roller 17 mounted on a rocking frame 18 (see Figure 2). The fabric of course, passes through the space between the two rollers and when it is to be introduced, the presser roller is held in a raised position as indicated in Figure 2. When the measuring is taking place, a spring or springs 19, associated with the rocking frame 18, hold the presser roller down against the fabric on the face of the measuring roller.

In applying my invention to such a machine, the measuring roller operates as a driving member for driving the indicating mechanism, and I provide a driving gear train for driving the indicating mechanism from the measuring roller at a predetermined movement ratio; I provide other means for driving the indicating mechanism from the driving member at an increased movement ratio when the measurement starts; by reason of this increased movement ratio, any backlash in the driving gear train will be eliminated after a certain amount of the measuring movement has occurred; I provide means for inhibiting the action of said other driving means when the indicating mechanism has had sufficient movement to eliminate this backlash; this inhibiting means operates to disconnect the other driving means automatically and connect up the measuring roller to the regular driving gear train. After this, the measuring movement proceeds through the driving gear train and the machine will indicate a correct reading of the measurement. In other words, I provide means for driving the indicating mechanism in the first part of the movement at an increased speed ratio until the backlash is eliminated, after which the machine drives in its regular or normal manner.

This effect is preferably accomplished by utilizing a main driving gear train and an auxiliary driving gear train together with clutch mechanism including a main clutch for the main driving gear train and an auxiliary clutch for the auxiliary driving gear train.

I also provide means for controlling the clutch mechanism from the indicating mechanism automatically so that after the zero-resetting movement, the auxiliary clutch will remain closed and the main clutch will remain open; this enables the indicating movement to start on the auxiliary clutch; and I provide automatic tripping means driven with the indicating mechanism which automatically effects the opening of the auxiliary clutch and the closing of the main clutch. I also provide means for holding the clutches both open until the indicating mechanism has become reset to zero, and I provide a connection to the presser roller to prevent the presser roller from being let down onto the measuring roller until the resetting movement has been completed.

I shall now describe this clutch mechanism and the automatic tripping means for controlling the same.

Figures 7, 8, 9, 10:
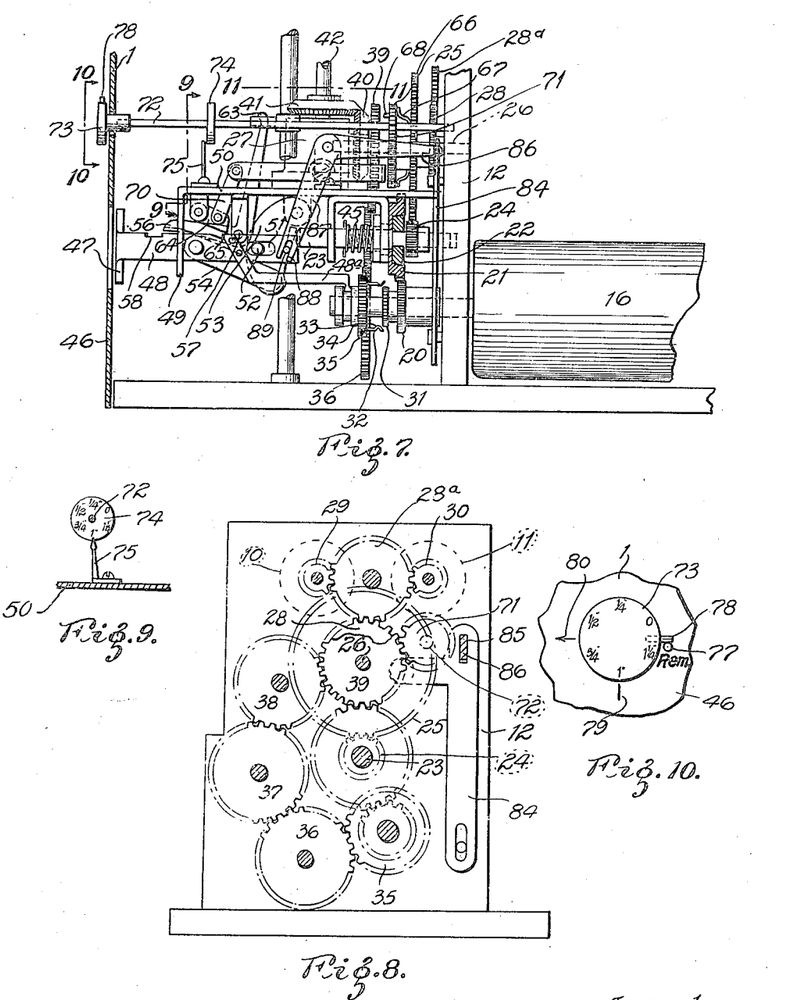
Figure 7 is a view similar to Figures 4 and 5, but showing the main driving clutch closed and the auxiliary driving clutch open; this view also illustrates the tripping mechanism, and the means for setting the same in any predetermined position.
Figure 8 is a diagrammatic view particularly illustrating the driving gear trains through which the indicating mechanism is actuated.
Figure 9 is a vertical section taken about on the line 9—9 of Figure 7, and particularly illustrating indicating means for indicating the position of the tripping pin of the tripping mechanism.
Figure 10 is a detail elevation taken about on the line 10—10 of Figure 7.

Referring to Figures 7 and 8, the main driving gear train includes a pinion 20 carried on the shaft of the measuring roller 16 and this pinion meshes with a gear 21 which operates as a clutch member to co-operate with a relatively movable clutch member 22 carried on a sliding clutch stem 23 (see Figure 7). When the clutch is closed, a pinion 24 rigid with the clutch member 22 will be driven and this pinion meshes with a large gear wheel 25 carried rigidly on a horizontal shaft 26, one end of which is rotatably mounted in the main frame plate 12 and the other end of which is rotatably mounted in a pillow block 27. Adjacent to the face of the main frame plate 12, the shaft 26 carries a gear wheel 28 which drives an idler 28ª (see Figure 8) that meshes with two pinions 29 and 30, carried respectively on the shafts of the two take-up rollers 11 and 12. With this construction, it is evident that when the main clutch 21—22 is closed, the take-up rollers 10 and 11 will be rotated in a direction to wind up the charts 7 and 8.

The other means, or auxiliary driving gear train, comprises an auxiliary clutch consisting of a clutch member 31 rigid on the pinion 20 having a serrated edge to co-operate with two jaws 32 carried on a movable sliding clutch collar 34 loosely mounted on the shaft of the measuring roller. This clutch collar 34 has a rigid pinion 35 (see Figures 7 and 8) which meshes with a gear train 36—37—38, the last named gear meshing with a gear wheel 39 rigid on the shaft 26. The pinion 35 is slightly larger than the pinion 20 so that when the shaft 26 is driven through this auxiliary gear train 36—37—38, the charts 7 and 8 will be driven at an increased movement ratio, that is to say, a given rotation of the measuring roller with this auxiliary gear train operating, would produce a greater movement than would be produced with the same rotation of the measuring roller driving the charts through the regular gear train, including the clutch 21—22 and the pinion 24.

Figure 6:
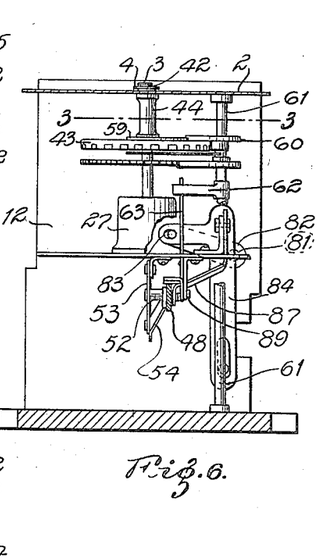
Figure 6 is an elevation and partial section, certain parts being broken away; this view particularly illustrates the connection to the presser roller and the means for controlling the clutches by the resetting movement.

Any suitable means may be provided for driving the pointers 3 and 4 from the shaft 26. For this purpose, I provide two beveled gears 40 and 41 (see Figure 7). The beveled gear 41 is rigid with an inner tubular shaft 42 and operates through a reduction gear 43 (see Figure 6) to drive an arbor 44 which carries the slow-moving pointer 4. With this driving arrangement, the hand or pointer 3 will make one revolution of the dial while the yard pointer 4 is moving through one of the numbered spaces of the dial. The dial illustrated enables the measurement of twelve yards to be indicated.

I provide a hand-operated member 47 for opening both clutches by the same movement and I provide a spring associated with the main clutch for closing the main clutch or tending to move the same to its closed position. I also provide detent means co-operating with the hand-operated member so as to effect the closing of the auxiliary clutch 31—33 while still maintaining the main clutch open.

In order to accomplish this, I provide a spring 45 (see Figure 7) which is disposed around the clutch shaft 23 and connected with the same so that it tends to hold the clutch 21—22 closed (see Figure 7). At the rear wall 46 of the casing, I provide a thumb plate 47 carried on a flat stem 48 which is guided to slide through a guide-bracket 49 which extends down from a horizontal frame plate 50. The inner end of this stem 48 is guided by a slot 51 Fig. 7 on a pin 52 which extends outwardly from the side face of a rocking plate 53, the upper end of which is pivotally attached at the underside of the frame plate 50. The lower end of this rocking plate 53 is pivotally attached to a link 54, the upper end of which is pivotally connected to the side of the stem 48. The rocking plate 53 is provided with a laterally bent flange 55 (see Figure 4) which engages the rear end of the clutch shaft or stem 23. With this organization of parts, it is evident that when the thumb plate 47 is pushed in, the main clutch 21—22 will be opened. The clutch arms 33 of the auxiliary clutch 31—33 are so constructed that when the main clutch is wide open, or closed, the bent ends of the arms 33 will not engage the clutch disc 31, and hence, the auxiliary clutch will be left open.

Figure 4:
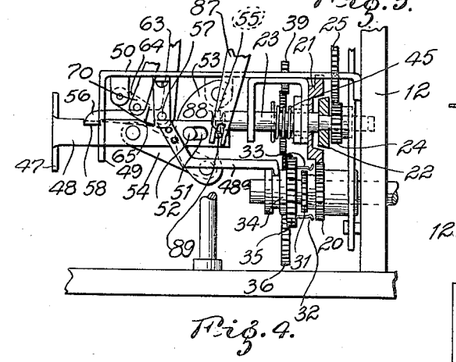
Figure 4 is a side elevation of part of the mechanism of the machine, and particularly illustrating the clutch mechanism; this view shows both the clutches of the machine in their open position.

When the thumb plate 47 is pushed in as far as possible and to the position in which it is shown in Figure 4, a main detent device or pawl 56, which is in the form of a bell crank lever mounted to rock on a pivot 57, drops down so that the end of the pawl engages in the notch 58 in the edge of this flat stem 48. This will hold both clutches open and the clutches will stay open until the indicating mechanism has been returned to zero by the spring 15 (see Figure 2). I provide means for releasing this main detent pawl 56 when the indicating mechanism arrives at zero. For this purpose, I provide an arm 59 carried on the lower end of the arbor 44 (see Figures 3 and 6). In this connection, it should be borne in mind that this arbor 44 rotates with the slow-moving pointer 4. In the zero-resetting movement, when the pointer 4 arrives at zero, this arm 59 will strike against a dog 60 carried rigidly on a vertical shaft 61 (see Figures 3 and 6) and rock this shaft. The lower portion of this shaft carries an arm 62 which engages the vertical arm 63 of the bell crank lever of which the pawl 56 forms a part. When this arm 62 strikes the arm 63, it releases the flat stem 48 from the pawl 56, and the spring then moves the sliding stem 23 toward the left.

Figure 5:
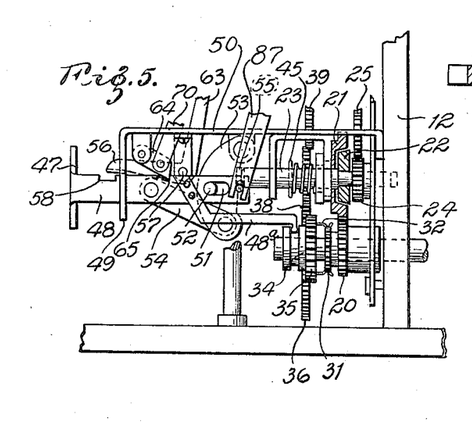
Figure 5 is a view similar to Figure 4, but showing the auxiliary clutch closed and the main clutch open.

In order to enable the flat stem 48 to control both clutches, the flat stem carries a rigid shifter arm 48ª, the end of which terminates in a yoke engaging a groove on the sliding collar 34 (see Figures 4 and 5).

When the main detent pawl 56 is released in the manner described above, the main clutch 21—22 is prevented from closing by additional detent means consisting of a detent pawl 64 (see Figures 4 and 5) which engages with a co-operating notch 65 in the adjacent edge of the flat stem 48. The effect of this detent pawl 64 therefore, is to prevent closing of the clutch 21—22, and to hold it slightly open (see Figure 5). In this position of the flat stem 48, the auxiliary clutch 31—33 is in its closed position. This is the position of the mechanism when a measuring movement starts. The indicating mechanism is then driven through the auxiliary gear train 35—36—37—38.

In order to trip this pawl 64 and release the stem 48 from it when the backlash has been taken up, I provide a tripping wheel 66 on the shaft 26 which is driven by the shaft 26 through a friction driving connection including two spring arms 67 carried by the gear 25 (see Figure 7) which press forcibly against the side face of the tripping wheel. The tripping wheel carries a tripping pin 68 (see Figure 11), into the path of which projects the bent end of a tripping lever 69, pivotally mounted on the pivot block 27, and connected by a link 70 through an opening in the frame plate 50, with the detent pawl 64. Of course, as soon as this detent pawl 64 is released, the clutch spring 45 completes the closing of the main clutch 21—22 and effects the opening of the auxiliary clutch 31—33.

The friction driving arms 67 for the tripping wheel 66 enable the tripping pin 68 to be adjusted into any predetermined position so as to regulate the amount of movement that will have to take place before the pawl 64 is tripped out. In order to accomplish this adjustment, the tripping wheel 66 is constructed in the form of a gear wheel, the teeth of which mesh with a pinion 71 carried on a rotary adjusting stem 72 having a thumb head 73 disposed on the outer side of the casing (see Figures 7 and 8). Every machine as it is being tested in the factory will have its tripping wheel 66 adjusted into the proper position to trip the pawl 64 as soon as the backlash of the machine has been taken up in the driving movement. For this purpose, I provide the adjusting stem 72 with a small dial 74 with graduations running from ¼ inch to 1¼ inches which are intended to co-operate with a fixed pointer 75 carried on the frame plate 50 (see Figures 7 and 9). Before the casing of the machine is put in place, this stem 72 is adjusted to any necessary position or point, as will be indicated by testing the measuring of the machine.

Machines of this kind are usually provided with a notching device or shear (not illustrated) which may be operated by means of a thumb plate 76 (see Figure 1). By reason of the fact that the knife is not in vertical alignment with the axis of the measuring roller, such a machine, if calibrated for measuring from a roll, would give a short measurement if used for measuring a remnant. It is therefore necessary with such machines to provide for increasing the reading of the machine when a remnant is being measured. This increase is usually one inch. I utilize the adjusting stem 72 for the purpose of adding an inch to the measurement before measuring a remnant. In other words, in measuring a remnant, I utilize the auxiliary fast-driving gear train to add an inch to the measurement, as though the backlash in the machine were an inch. As soon as this inch has been added, the tripping pin 68 trips out the auxiliary driving train and the main driving gear train comes into operation.

In order to accomplish this, it is merely necessary to provide a scale on the edge of the thumb head 73 graduated from zero to 1¼ inches, the divisions being ¼ inch divisions. On the outer face of the wall of the casing, a stop pin 77 is provided and the edge of the thumb head 73 is provided with a dog or pin 78. When a remnant is to be measured, the thumb head 73 is rotated toward the right until the dog 78 comes up against the pin 77; then the number 1 on the scale opposite to the mark 79 on the casing will indicate that one inch is being added to the measurement. To adapt the tripping mechanism again for simply adding the backlash to the measurement, the operator simply rotates the thumb head 73 toward the left until the dog 78 coincides with the arrow 80, adjacent the edge of the thumb head opposite to the stop 77. When the dog 78 is opposite the arrow 80, the quarter mark on the thumb head will be about opposite to the mark 79, and this will indicate that the machine is then set for adding ¼ inch backlash.

I provide means for preventing the lowering of the presser roller 17 until the machine has returned to zero. For this purpose, the rocking shaft 81 of the presser roller frame 18 is extended through the frame plate 12 and carries a rigid arm 82 Figs. 3 and 6. This arm is connected by a pin and slot connection 83 with a plate 84 guided to move vertically on the face of the frame plate 12. The upper end of this sliding plate 84 has a slot 85 (see Figure 8) which is engaged by the extremity of a horizontal arm 86 of a bell crank lever having a substantially vertical arm 87 (see Figure 7), which extends downwardly and is provided with a slot 88 receiving a pin 89. With this organization of parts, it will be evident that by shoving in on the thumb plate 47, the bell crank lever, composed of the arms 86 and 87, will operate to raise the presser roller through the agency of the arm 82. When the presser roller is raised in this way, a latch 90 pivoted at 91 (see Figure 3) operates to engage an arm 92 which projects out from the presser roller frame, and this will hold the presser roller raised. A spring 93 will actuate this latch to engage the arm. This latch has a thumb plate 94 which, if pressed inwardly, will release the arm 92 from the latch.

It will be evident that if a careless operator presses the latch 94 before the indicating mechanism has been completely returned to zero, the presser roller cannot descend upon the measuring roller because it will be prevented from doing so by the bell crank lever arms 86 and 87, which cannot move until the flat stem 48 is released from its main detent pawl 56; and this will not occur until the indicating mechanism has arrived at zero.

I shall now briefly describe the mode of operation of the complete machine.

The fabric is introduced between the rollers 16 and 17 (see Figure 2) when the presser roller 17 is raised. The latch 90 is then operated to release the presser roller frame and the springs 19 will then pull the presser roller down onto the fabric and press the same against the measuring roller. The machine should now be indicating zero. The operator then pulls the fabric through the machine and past the measuring roller. The detent pawl 64 is now in engagement with its notch 65 (see Figure 5) so that the auxiliary clutch 31—33 is closed and the driving of the indicating mechanism occurs through the pinion 35 and gears 36, 37 and 38 (see Figure 8). This will drive the indicating mechanism at an increased speed ratio and as the measuring movement progresses, the shaft 26 (see Figure 7) will be rotated. When the backlash of the machine has been taken up and the machine is reading correctly, the tripping pin 68 on the tripping wheel 66 will engage the bent end of the tripping lever 69 (see Figure 11) and this will operate the link 70 to release the pawl 64. The clutch spring 45 will then close the main clutch 21—22 (see Figure 7), and simultaneously open, through the medium of a shifter arm 48ᵃ and a touch ring 34 the auxiliary clutch 31—33; from this point on, the indicating mechanism will be driven through the main clutch 21—22 and through the pinion 24 and the gear 25.

When the machine is being reset to zero, the operator shoves in on the thumb plate 47. This opens both the main clutch and the auxiliary clutch; as soon as they are open, the main detent pawl 56 drops into the notch 58 and holds both the clutches open. The spring 15 then operates to return the charts and the pointers 3 and 4 to the zero position, that is to say, it resets the indicating mechanism to zero. As soon as the indicating mechanism arrives at zero, the arm 59 which rotates with the yard pointer 4 strikes the dog 60 (see Figure 3) and rocks the vertical rock shaft 61. The arm 62 on this rock shaft (see Figure 6) then actuates the vertical arm 63 of the detent pawl 56; this releases the pawl 56. The clutch spring 45 then moves the main clutch member 22 further on toward its closed position, but the pawl 64 engages the notch 65 (see Figure 5) and prevents the main clutch from closing; and in this position of the stem 48, the auxiliary clutch 31—33 is held closed. This is as it should be because the machine is now set for starting the movement on the fast-moving driving gear train, including the gears 36 and 37.

In testing the machine at the factory, the scale on the disc 74 enables the tripping wheel 66 to be set on the friction arms 67 so as to trip the lever 69 as soon as the backlash has been taken up, thereby tripping out the pawl 64 and permitting the main clutch 21—22 to close, after which the driving will occur in the regular manner through the pinion 24 and the gear 25.

When the pin 78 on the thumb head is up against the stop 77, the machine is properly set to trip the pawl 64 when an inch has been added to the measurement. This adapts the machine for measuring a remnant.

When remnants are not being measured, the pin 78 should lie over the arrow 80 and the machine would then be adapted to trip the pawl 64 as soon as the backlash has been taken out or eliminated from the driving movement.

The operator of the machine cannot let the presser roller down on the measuring roller until the indicating mechanism has been returned to zero, by reason of the connection through the plate 84, because the plate 84 cannot move down until the flat stem 48 is released from its main detent pawl 56, which will not occur until the indicating mechanism has arrived at zero.

It is understood that the embodiment of the invention described herein is only one of many embodiments my invention may take, and I do not wish to be limited in the practice of my invention nor in my claims, to the particular embodiment set forth,

What I claim is:

1. In a measuring machine, the combination of indicating mechanism, a driving member mounted so as to be rotated in making the measurement, a driving gear train for driving the indicating mechanism from the driving member at a predetermined movement ratio, means for driving the indicating mechanism from the driving member at an increased movement ratio when the measurement starts, and means for inhibiting the action of the last named means when the lost motion due to the backlash of the said driving gear train has been compensated for, said driving gear train operating thereafter to effect the driving of the indicating mechanism through the said gear train.

2. In a measuring machine, the combination of indicating mechanism, a driving member mounted so as to be rotated in making the measurement, a driving gear train for driving the indicating mechanism from the driving member at a predetermined movement ratio, means for driving the indicating mechanism form the driving member at an increased movement ratio when the measurement starts, and means moving with the indicating mechanism for inhibiting the action of the last named means when the lost motion due to the backlash of the said driving train has been compensated for, said driving gear train operating thereafter to effect the driving of the indicating mechanism.

3. In a measuring machine, the combination of indicating mechanism, a driving member mounted so as to be rotated in making the measurement, a driving gear train for driving the indicating mechanism from the driving member at a predetermined movement ratio, means for driving the indicating mechanism from the driving member at an increased movement ratio when the measurement starts including clutch mechanism, and automatic means for controlling the clutch mechanism to inhibit the action of the last named means when the backlash of the said driving gear train has been taken up, and operating thereafter to effect the driving of the indicating mechanism through the said gear train.

4. In a measuring machine, the combination of indicating mechanism, a driving member mounted so as to be rotated in making the measurement, a main driving gear train for driving the indicating mechanism from the driving member at a predetermined movement ratio, an auxiliary driving gear train for driving the indicating mechanism from the driving member at an increased movement ratio when the measurement starts including clutch-mechanism, and means for controlling the same to discontinue the driving through the auxiliary gear train and effect the driving thereafter through the main driving gear train.

5. In a measuring machine, the combination of indicating mechanism, a driving member mounted so as to be rotated in making the measurement, a main driving gear train for driving the indicating mechanism from the driving member at a predetermined movement ratio, an auxiliary driving gear train for driving the indicating mechanism from the driving member at an increased movement ratio when the measurement starts, means for returning the indicating mechanism to zero after a measurement, means for driving the indicating mechanism through the auxiliary driving train when the measurement is started, and means for discontinuing the driving through the auxiliary driving train after a predetermined movement, and for effecting the driving thereafter through the main driving gear train.

6. In a measuring machine, the combination of indicating mechanism, a driving member mounted so as to be rotated in making the measurement, a main driving gear train for driving the indicating mechanism from the driving member at a predetermined movement ratio, an auxiliary driving gear train for driving the indicating mechanism from the driving member at an increased movement ratio when the measurement starts, clutch mechanism capable of connecting the driving member to the main driving gear train, and also to the auxiliary driving gear train to enable the driving member to drive the indicating mechanism through either of said gear trains, means for controlling the clutch mechanism to disconnect the driving member from both of the driving gear trains, means for returning the indicating mechanism to zero when the driving member is disconnected, means for setting the clutch mechanism after the indicating mechanism has been returned to zero, in a position to effect the driving of the indicating mechanism through the auxiliary driving gear train, and automatic means for controlling the clutch mechanism to discontinue the driving through the auxiliary gear train at a predetermined point and effect the driving thereafter through the main driving gear train.

7. In a measuring machine, the combination of indicating mechanism, a driving member mounted so as to be rotated in making the measurement, a main driving gear train for driving the indicating mechanism from the driving member at a predetermined movement ratio, an auxiliary driving gear train for driving the indicating mechanism from the driving member at an increased movement ratio when the measurement starts, clutch mechanism including a main clutch for driving the main driving gear train from the driving member, and an auxiliary clutch for driving the auxiliary driving gear train from the driving member, means for opening both clutches simultaneously, means for resetting the indicating mechanism to zero when both clutches are open, and automatic means for setting the clutch mechanism after the resetting movement, so that the auxiliary clutch is closed and the main clutch open.

8. In a measuring machine, the combination of indicating mechanism, a driving member mounted so as to be rotated in making the measurement, a main driving gear train for driving the indicating mechanism from the driving member at a predetermined movement ratio, an auxiliary driving gear train for driving the indicating mechanism from the driving member at an increased movement ratio when the measurement starts, clutch mechanism including a main clutch for driving the main driving gear train from the driving member, and an auxiliary clutch for driving the auxiliary driving gear train from the driving member, means for opening both clutches simultaneously, means for resetting the indicating mechanism to zero when both clutches are open, automatic means for setting the clutch mechanism after the resetting movement, so that the auxiliary clutch is closed and the main clutch open, and automatic means for opening the auxiliary clutch after a predetermined amount of measuring movement and for effecting the closing of the main clutch to continue the driving movement through the main driving gear train.

9. In a measuring machine, the combination of indicating mechanism, a measuring roller, a presser roller movable toward or from the measuring roller to co-operate therewith in the measuring movement, a main driving gear train for driving the indicating mechanism from the measuring roller at a predetermined movement ratio, an auxiliary driving gear train for driving the indicating mechanism from the measuring roller at an increased movement ratio when the measurement starts, clutch mechanism including a main clutch for driving the main driving gear train from the measuring roller, and an auxiliary clutch for driving the auxiliary driving gear train from the measuring roller, means for opening both clutches simultaneously, means for resetting the indicating mechanism to zero when both clutches are open, automatic means for setting the clutch mechanism after the resetting movement so that the auxiliary clutch is closed and the main clutch open, and means for preventing the movement of the presser roller against the measuring roller until the resetting movement to zero is completed.

10. In a measuring machine, the combination of indicating mechanism, a measuring roller, a presser roller movable toward or from the measuring roller to co-operate therewith in the measuring movement, a main driving gear train for driving the indicating mechanism from the measuring roller at a predetermined movement ratio, an auxiliary driving gear train for driving the indicating mechanism from the measuring roller at an increased movement ratio when the measurement starts, clutch mechanism including a main clutch for driving the main driving gear train from the measuring roller, and an auxiliary clutch for driving the auxiliary driving gear train from the measuring roller, a hand-operated member for opening both clutches by the same movement, means for resetting the indicating mechanism to zero when both clutches are open, means operating to return the hand-operated member and move the same in a direction to close both the clutches, a detent operating to hold the hand-operated member against return to maintain both clutches open, means operated automatically by the indicating mechanism to release the detent when the indicating mechanism has been reset to zero and thereby permit a movement of the hand-operated member sufficient to close the auxiliary clutch but maintain the main clutch open whereby the commencement of the measuring movement will operate to drive the indicating mechanism through the auxiliary driving train, and automatic means for permitting a further movement of the hand-operated member to effect the opening of the auxiliary clutch and the closing of the main clutch at a predetermined point in the measuring movement.

11. In a measuring machine, the combination of indicating mechanism, a measuring roller, a presser roller movable toward or from the measuring roller to co-operate therewith in the measuring movement, a main driving gear train for driving the indicating mechanism from the measuring roller at a predetermined movement ratio, an auxiliary driving gear train for driving the indicating mechanism from the measuring roller at an increased movement ratio when the measurement starts, clutch mechanism including a main clutch for driving the main driving gear train from the measuring roller, and an auxiliary clutch for driving the auxiliary driving gear train from the measuring roller, a hand-operated member for opening both clutches by the same movement, means for resetting the indicating mechanism to zero when both clutches are open, a spring operating to return the hand-operated member and close both clutches, detent means including a detent pawl and means on the hand-operated member for holding the hand-operated member in a position to hold both clutches open, means operated automatically by the indicating mechanism to release the said pawl when the indicating mechanism has been reset to zero, a second detent means including a second detent pawl and means carried by the hand-operated member co-operating with the second detent pawl to prevent a complete return movement of the hand-operated member by its spring, and co-operating to arrest the returning movement thereof with the auxiliary clutch closed and the main clutch open, whereby the commencement of the measuring movement will operate to drive the indicating mechanism through the auxiliary driving train, and automatic means for releasing said second named pawl to permit the complete return movement of the hand-operated member by its spring and thereby effect the opening of the auxiliary clutch and the closing of the main clutch at a predetermined point in the measuring movement.

12. In a measuring machine, the combination of indicating mechanism, a driving member mounted so as to be rotated in making the measurement, a driving gear train for driving the indicating mechanism from the driving member at a predetermined movement ratio, means for driving the indicating mechanism from the driving member at an increased movement ratio when the measurement starts, a tripping wheel moving with the indicating mechanism and carrying a tripping pin, means actuated by the tripping pin for inhibiting the action of the last named means when the backlash of the said driving train has been taken up, said driving gear train operating thereafter to effect the driving of the indicating mechanism, and means for adjusting the position of the tripping wheel so as to alter the point at which the tripping pin operates.

13. In a measuring machine, the combination of indicating mechanism, a driving member mounted so as to be rotated in making the measurement, a main driving gear train for driving the indicating mechanism from the driving member at a predetermined movement ratio, an auxiliary driving gear train for driving the indicating mechanism from the driving member at an increased movement ratio when the measurement starts, a tripping wheel moving with the indicating mechanism and carrying a tripping pin, means actuated by the tripping pin for discontinuing the driving through the auxiliary driving train after a predetermined movement and for effecting the driving thereafter through the main driving gear train, a scale for indicating the amount of increase in the measurement which will be effected when the tripping pin is placed in predetermined positions, and means for adjusting the tripping wheel into any predetermined position, and including a pointer co-operating with the said scale.

14. In a measuring machine, the combination of indicating mechanism, a driving member mounted so as to be rotated in making the measurement, a main driving gear train for driving the indicating mechanism from the driving member at a predetermined movement ratio, an auxiliary driving gear train for driving the indicating mechanism from the driving member at an increased movement ratio when the measurement starts, a trip wheel carrying a tripping pin, a friction driving connection for driving the same, clutch mechanism controlled by the tripping pin for discontinuing the driving through the auxiliary driving train after a predetermined movement, and for effecting the driving thereafter through the main driving gear train, a scale for indicating the amount which will be added to the measurement for predetermined positions of the tripping wheel, and means for adjusting the tripping wheel on its friction drive connection including a pointer co-operating with the scale to indicate the amount which will be added to the measurement when the drive through the auxiliary driving train is discontinued.

In testimony whereof, I have hereunto set my hand.

JOHN L. WHEELER.